United States Patent [19]

Quesinberry et al.

[11] Patent Number: 4,720,711
[45] Date of Patent: Jan. 19, 1988

[54] AGILE-BEAM TRACK-WHILE-SCAN RADAR SYSTEM

[75] Inventors: Elmen C. Quesinberry, Severna Park; Charles D. Morgan, Jr., Arbutus; Steven J. Clancy, Ellicott City, all of Md.

[73] Assignee: Westinghouse Electric Corp., Pittsburgh, Pa.

[21] Appl. No.: 745,722

[22] Filed: Jun. 17, 1985

[51] Int. Cl.$^4$ ............................................. G01S 13/72
[52] U.S. Cl. ................................................... 342/96
[58] Field of Search ...................... 343/7.3, 7.4, 5 DP, 343/7 A; 342/96, 73, 82, 89

[56] References Cited

U.S. PATENT DOCUMENTS 4,593,286   6/1986   Mathews et al. ..................... 342/88

Primary Examiner—T. H. Tubbesing
Assistant Examiner—Mark Hellner
Attorney, Agent, or Firm—W. G. Sutcliff

[57] ABSTRACT

A mode scheduling system for selecting track or search dwells in a track-while-scan radar. Targets to be tracked are classified according to acceleration levels and then arranged into priority classes based upon the acceleration. A relative update frequency for the targets in the priority classes is established. The track and search dwells are made during a repetitive dwell period having a predetermined number of track dwell intervals. Track dwells are scheduled during these intervals to satisfy the update frequency requirements. When all of the track dwell positions are not needed, search dwells are substituted for some of the track dwells. Search dwells are also inserted between track dwells, as needed, to maintain a minimum amount of search time regardless of the number of targets being tracked.

15 Claims, 11 Drawing Figures

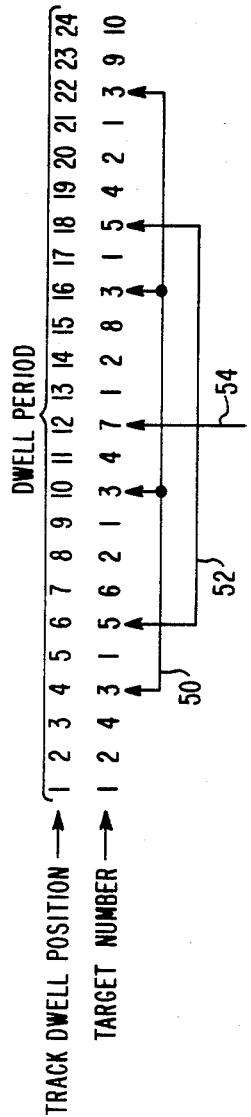

AGILE-BEAM TRACK-WHILE-SCAN RADAR SYSTEM

BACKGROUND OF THE INVENTION

This invention relates, in general, to radar systems and, more specifically, to signal processing equipment for scheduling between track and search modes in radar systems.

The rapid beam agility which is available with agile-beam or phased array radar antennas with electronic beam steering permits both accurate tracking of and searching for radar targets almost simultaneously. According to conventional practices, such radar systems use a portion of the radar operating time to search the entire region capable of being illuminated by the radar for the presence of targets, such as aircraft. Another portion of the operating time is used to track targets which have already been detected in previous search intervals. Since agile-beam antennas can be steered very rapidly, the radar operating time portions allocated to searching and to tracking can be closely spaced in time, with the differences according to current technology on the order of milliseconds.

Because of the ability to change between search and track modes rapidly, the manner of making such changes or scheduling becomes important and has been the subject of several U.S. patents. In general, these patents use the speed or acceleration of the targets to make a determination as to which mode the radar will use at any particular instant. The higher the speed or acceleration, the more important it is to track the targets more frequently, thus sacrificing searching time.

U.S. Pat. No. 3,858,206, issued on Dec. 31, 1974, discloses a system for scheduling between search and track modes in a track-while-scan radar. According to this patent, the frequency at which a target is required to be updated is determined as a function of target acceleration, distance to the target, and the size of the azimuth window containing the target. The calculated update time is compared to fixed values of 2, 4, 6, 8 and 10 seconds and the closest match is selected as the fixed time after which it is desired to update a target track. The higher priority targets are updated more frequently, or with less time between updates. After determining the fixed update time interval, it stores this value in memory associated with that target for future reference.

Every time the radar is ready to send out the radar signals, it looks at the data stored in memory and goes through a process to determine if the current signal should be a track or a search signal. It first processes the data to find the target most needing to be updated by looking at the ratio between the time since last updated and the desired update time. If the ratio is less than or equal to one, the radar goes into the search mode. If the ratio is greater than one, the track ratio is compared with a search ratio and, if the search ratio is smaller, the radar goes into the track mode for the target corresponding to the largest track priority ratio. If the search ratio is equal to or larger than the track ratio, the radar goes into the search mode. The search ratio is calculated from information dependent upon the number of targets needing to be tracked, a nominal search rate, and the time of the last search.

The present invention, unlike the referenced patent, uses target acceleration to classify all of the targets into a relative table of update frequencies which specify, not exact amounts of time, but frequencies by which the targets are updated in each radar cycle. Once classified, the radar cycle adheres to the relative update frequencies without any calculation of how long it has been since the last update of a particular target. Search dwells are inserted into the radar cycle at various intervals depending upon the time needed in the tracking mode to satisfy the assigned update requirements of the relative table. The relative update frequency is unaffected by the number or duration of the radar looks in a track or search dwell.

Therefore, it is desired, and it is an object of this invention, to provide a system for scheduling between track and search dwells in a track-while-scan radar system wherein the scheduling process matches the beam steering capabilities of a modern, agile-beam radar against the signal integration and track update rate requirements of multiple targets maneuvering at varying rates.

SUMMARY OF THE INVENTION

There is disclosed herein a new and useful system for scheduling between track and search modes in a track-while-scan radar. The scheduling system classifies all of the targets according to the observed acceleration levels. Then, each classified target is placed into update priority classes according to the acceleration levels, with the highest priority class corresponding to the highest acceleration range. The number of targets placed in a priority class is limited to a maximum number, except for the lowest priority class.

A relative update frequency is established for each priority class. The update frequency corresponds to the number of times during a track dwell period that track dwells are processed by the radar to update the position of any targets in that class. The processor is divided into two main portions or submodules, one for classifying the targets into priority classes and one for scheduling the radar dwells as either search or track dwells.

A dwell period is established with a predetermined number of track dwell positions. The processor classifies the targets and schedules the track dwells so that the update requirements are met. When all of the track dwells are not needed for tracking to satisfy the update requirements, search dwells are substituted by the processor for the unneeded track dwells. In order to maintain a minimum level of radar time for searching, the processor inserts a minimum number of search dwells between the track dwell positions. If timing permits, additional search dwells are inserted to increase the overall search time.

When the number of targets to be tracked exceeds the number which can be updated during each dwell period according to the update frequency requirements, the targets in the lowest priority class are divided into groups. The targets in each group are separately updated during successive dwell periods. Under such conditions, all of the targets in the other priority classes are still updated during each dwell period the required number of times.

BRIEF DESCRIPTION OF THE DRAWINGS

Further advantages and uses of this invention will become more apparent when considered in view of the following detailed description and drawings, in which:

FIG. 3 is a table indicating various values and classes used in the description of the diagram shown in FIG. 2;

FIG. 4A is a diagram illustrating the placement of track dwells by the processor of this invention for a ten target condition;

FIG. 4B is a diagram illustrating the placement of track dwells by the processor of this invention for a one target condition;

DESCRIPTION OF THE PREFERRED EMBODIMENTS

Figure 1:
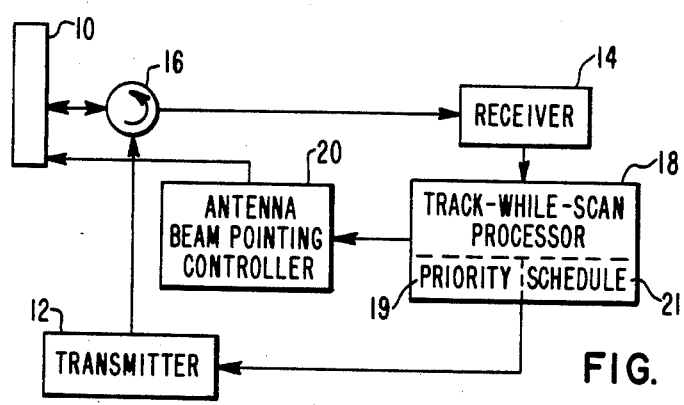
FIG. 1 is a block diagram of a radar system constructed according to this invention.

Throughout the following description, similar reference characters refer to similar elements or members in all of the figures of the drawing.

Referring to the drawing, and to FIG. 1 in particular, there is shown a block diagram of a radar system constructed according to this invention. The radar antenna 10 is used to illuminate the target area with signals from the transmitter 12 and to receive or capture echo signals returned by targets and apply the signals to the receiver 14. The circulator 16 functions, as is well known in the art, to suitably connect the antenna 10 to the radar transmitter 12 and receiver 14 in such a manner as to isolate the transmitter and receiver from each other. The radar antenna 10 may be a mechanically moved array which must be physically moved to change the beam or main radiation lobe of the antenna. However, to fully utilize the improvements offered by the present invention, an agile-beam antenna is preferable since it affords quicker shifting of the beam in any desired direction.

The track-while-scan processor 18 receives signals from the radar receiver 14 and sends out control signals to the transmitter 12 and to the antenna beam pointing controller 20. This very generalized block diagram of a radar system indicates that the track-while-scan processor 18 acts upon information relative to the radar targets and responds thereto by controlling certain aspects of the transmitted signal, including the direction and type of signal. More specifically, the track-while-scan processor 18 takes information corresponding to the maneuvering or acceleration of the observed targets and controls the mode of the transmitter 12 between tracking for known targets and searching for new targets. As will be described later in more detail, the processor 18 includes portions or submodules 19 and 21 which perform priority and scheduling functions.

Figure 2:
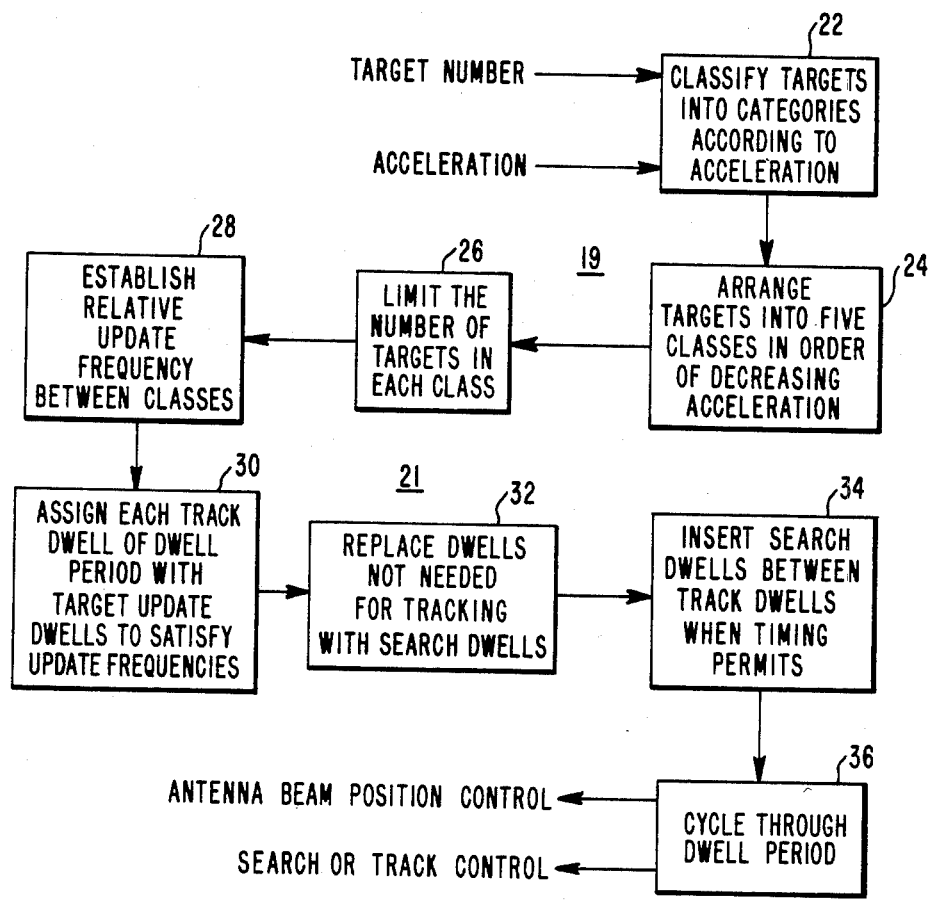
FIG. 2 is a block diagram showing detailed functions of the processor shown in FIG. 1.

FIG. 2 is a block diagram indicating the general functions of a track-while-scan processor suitable for use in the radar system of FIG. 1. According to block 22, the first function of the processor is to classify the known targets into separate categories depending upon the acceleration of the targets. The input information must include the identity or number of the target and the acceleration of the target. A method for estimating the acceleration of maneuvering targets is disclosed in U.S. Pat. No. 4,148,029, issued Apr. 3, 1979, and assigned to the same assignee as this invention. The categories of classification correspond to different ranges of target acceleration. The functioning of the processor shown in FIG. 2 is best understood by observing the table shown in FIG. 3.

FIG. 3 is a table indicating the various quantities used, derived, or classified according to the processing technique shown in FIG. 2. According to the table of FIG. 3, the targets are classified into five classes of acceleration levels. These ranges are shown in column 40 of FIG. 3. As can be seen from column 40, there are four acceleration levels or ranges between 0 and 6 G's, and one acceleration range for all values above 6 G's. All observed target acceleration values would fit somewhere within one of the designated acceleration ranges.

Block 24 of FIG. 2 indicates that the targets contained within the acceleration ranges are arranged into classes in order of decreasing acceleration, such as shown by column 38 of FIG. 3. In other words, the most severely maneuvering targets, or targets with the highest acceleration values, are grouped into update priority class number one if they have an acceleration value greater than 6 G's. It is emphasized that other values of acceleration may be used to establish the ranges indicated in column 40, and more or less update priority classes, as shown in column 38, may be used without departing from the teachings of this invention.

Column 48 of FIG. 3 indicates how ten targets, identified by the numbers 1 through 10, would be classified into the priority classes according to this invention. It is assumed that target 1 has an acceleration above 6 G's, targets 2 and 3 have an acceleration between 4 and 6 G's, target 4 has an acceleration between 2 and 3.99 G's, target 5 has an acceleration between 1 and 1.99 G's, and targets 6 through 10 have acceleration levels between 0 and 0.99 G's.

The grouping of two targets, targets 2 and 3, into the second priority class and of five targets, targets 6 through 10, into the fifth update priority class is done to satisfy the requirements indicated in column 46 of FIG. 3 and in block 26 of FIG. 2. Blocks 22, 24 and 26 generally form the priority portion 19 of the processor 18 shown in FIG. 1. When any class is full because of the requirements of column 46, any remaining targets are pushed to the next lower class. It is emphasized that other grouping patterns may be used without departing from the invention. It has been found, however, that the acceleration levels and the number of targets which can be tracked in each classified level is determined mainly from the characteristics and operating parameters of the radar system. While no definite relationship exists which determines the values selected for the quantities in the columns of FIG. 3, experience has shown that these quantities, or quantities in the same range, are those which are most desired with typical state of the art radar equipment.

Column 42 of FIG. 3 establishes a relative update frequency between the priority classes. This is also indicated by block 28 of FIG. 2. The relative update frequency indicates the number of times each priority class is updated during a dwell period, or time interval during which all targets are updated, unless the classes are saturated by more than ten targets, which will be explained later. According to column 42, a target in the highest or first update priority class is updated six times for every time a target in the fifth priority class is updated. As another example, any target contained in the second update priority class is updated twice as frequently as any target contained in the fourth update priority class. Here again, experience has shown that, in order to accurately track targets moving at the acceleration levels indicated in column 40, the relative update frequencies must correspond generally to the values shown in column 42.

As will be described also in connection with FIGS. 4A and 4B, the processor shown in FIG. 2 continues the processing according to block 30 by assigning a specified number of intervals of the transmitted radar signal to tracking functions. The radar signal includes a time period which is repeated continuously and repetitively during the operation on the radar. This time period is referred to herein as the dwell period since it contains a number of track dwell positions or intervals which may be used to send tracking signals and, in some cases, searching signals from the radar. In other words, a dwell period consists of several track dwell positions or intervals which are repeated continuously throughout the operation of the radar system.

As indicated in block 30 of FIG. 2, the track dwells are assigned as target update dwells to satisfy the update frequency requirements. According to block 32, when the number of targets and/or the target acceleration values are such that not all track dwell positions are needed to satisfy the relative update frequency criteria, some of the track dwell positions are replaced by search dwells. In other words, when column 42 of FIG. 3 is satisfied without using all of the allocated dwells as target track dwells, target search dwells are substituted for the unneeded track dwells.

Since the radar system is capable of searching and tracking at substantially the same time, the processor of FIG. 2 also inserts search dwells between track dwells in order to maintain a minimum amount of search time for the radar system. Search dwells are inserted when such insertion wil not keep the system from complying with the requirements of the relative update frequencies, as shown in block 34. Block 36 of FIG. 2 indicates that the dwell period is cycled continuously by the radar system and, except in the case where the number of targets exceeds 10, the process is repeated identically on each dwell period unless the variables change, such as the number or acceleration of targets being tracked. Blocks 28, 30, 32 and 34 generally form the scheduling portion 21 of the processor 18 shown in FIG. 1.

According to FIG. 4A, the repetitive dwell period of this specific embodiment includes 24 track dwell positions, or positions primarily used to update all of the known targets. The radar system cycles through these 24 positions by going back to position 1 after finishing position 24. Whether a track dwell position is used as a track dwell to update a particular target is determined by the processor, based upon the number of targets in the five priority classes. When not all of the positions are needed, some track dwell positions are used for search dwells. In addition, search dwells are interleaved between some of the track dwell positions to maintain a minimum amount of search time. In the specific embodiment disclosed herein and explained in more detail later, a minimum of 49% of the total dwell time is allocated for searching.

The second row of FIG. 4A illustrates the pattern in which the processor updates targets 1 through 10 to comply with the relative update frequency requirements. The targets are aligned under the track dwell position during which the update of the target takes place. The relative frequency of the updates is satisfied as can be seen by comparing the number of updates with the requirements stated in column 42 of FIG. 3. For example, target 3 is updated four times in one dwell period, as indicated by pointer system 50. Target 5 is updated the required two times, as indicated by pointer system 52. By last example, target 7 is updated the required one time, as indicated by pointer 54.

Column 44 of FIG. 3 indicates the approximate target update frequencies required to satisfy the relative update frequencies of column 42 for short and long range radar looks. These values are based upon typical state-of-the-art values for the duration of each medium-PRF radar look, which are 5 ms at short range and 11 ms at long range. Three looks are assumed to constitute a track dwell, and seven looks constitute a search dwell. These values limit the total number of track dwells to 66.7 per second at short range and 30.3 per second at long range, even if no searching is performed. On the other hand, if no tracking is performed, there are 28.6 search dwells available per second at long range. The search sector covered per dwell is dependent upon the radar beamwidth. If a nominal value of 3.7 degrees of coverage is assumed for each search dwell, the maximum search scan rate is 3.7 degrees times 28.6, or 105.8 degrees per second at short range, and 3.7 degrees time 13, or 48.1 degrees per second at long range. If 49% of the time is allocated to searching and the remainder to tracking, a total of 34 track dwells per second are available with 51.8 degrees per second average scan rate at short range. At long range, there are 15.5 total track dwells available per second with 23.6 degrees per second average scan rate.

FIG. 4B illustrates the uses of the dwell positions during the repetitive dwell period for a situation where only one target, with acceleration sufficient to put it into priority class 1, is being tracked. The track dwell positions 1, 5, 9, 13, 17 and 21 are used as track dwells to update target 1 six times during each dwell period. The remainder of the track dwell positions are used as search dwells since these positions are not needed as track dwells to satisfy the relative update frequency criteria when only one target is being tracked. A similar condition of using some track dwells for search dwells would be the case whenever the number of targets is low enough that not all of the dwell positions are needed for tracking updates to comply with the update frequency requirements of the system. In addition to the track dwell positions being used as search dwells, it is emphasized that the processor of this invention also inserts, when time permits, search dwells between track dwell positions. As already stated, the processor schedules interleaved search dwells so that at least 49% of the time required to complete a dwell period is devoted to search dwells.

When more than ten targets are being tracked, the update requirements listed in FIG. 3 cannot be met during each dwell period with a 24 position dwell period. In such situations, the lowest priority class, i.e. class 5, contains more than six targets to update. The processor, in such situations, alternates these low priority targets in blocks of 5 during successive dwell periods. For example, with twenty targets being tracked and with the targets contained in priority class 5 designated as targets 6 through 20, a first dwell period would update, in addition to the higher priority targets, targets 6 to 10, a second dwell period would update targets 11 to 15, and a third dwell period would update targets 16 to 20. After the third dwell period, the process is repeated with a dwell period similar to the first dwell period.

Test results have shown that the processing technique disclosed herein maintains 95% of the radar looks for searching when a single, low priority, target is being tracked. With a ten-target group having accelerations which range from 0 to 9 G's, the track data rates vary from 8.4 Hz for a 9-G target at short range to 1.4 Hz for zero-G targets. These rates apply approximately for long range tracking if searching has been excluded. Long range tracking with searching approximately halves these track update rates. The minimum search scan rate is 52 deg/sec at short range and 24 deg/sec at long range. With twenty targets, the lowest update rates are 0.47 Hz at short range and 0.21 Hz at long range. The same search scan rates are maintained for both the ten-target group and the twenty-target group.

FIGS. 5, 6, 7, 8, 9 and 10 are flow chart diagrams of a Fortran program which may be used to implement the functions of the radar submodules. The terminology used is characteristic of Fortran programs, although other types of programming languages could be used without departing from the invention.

Figure 5:
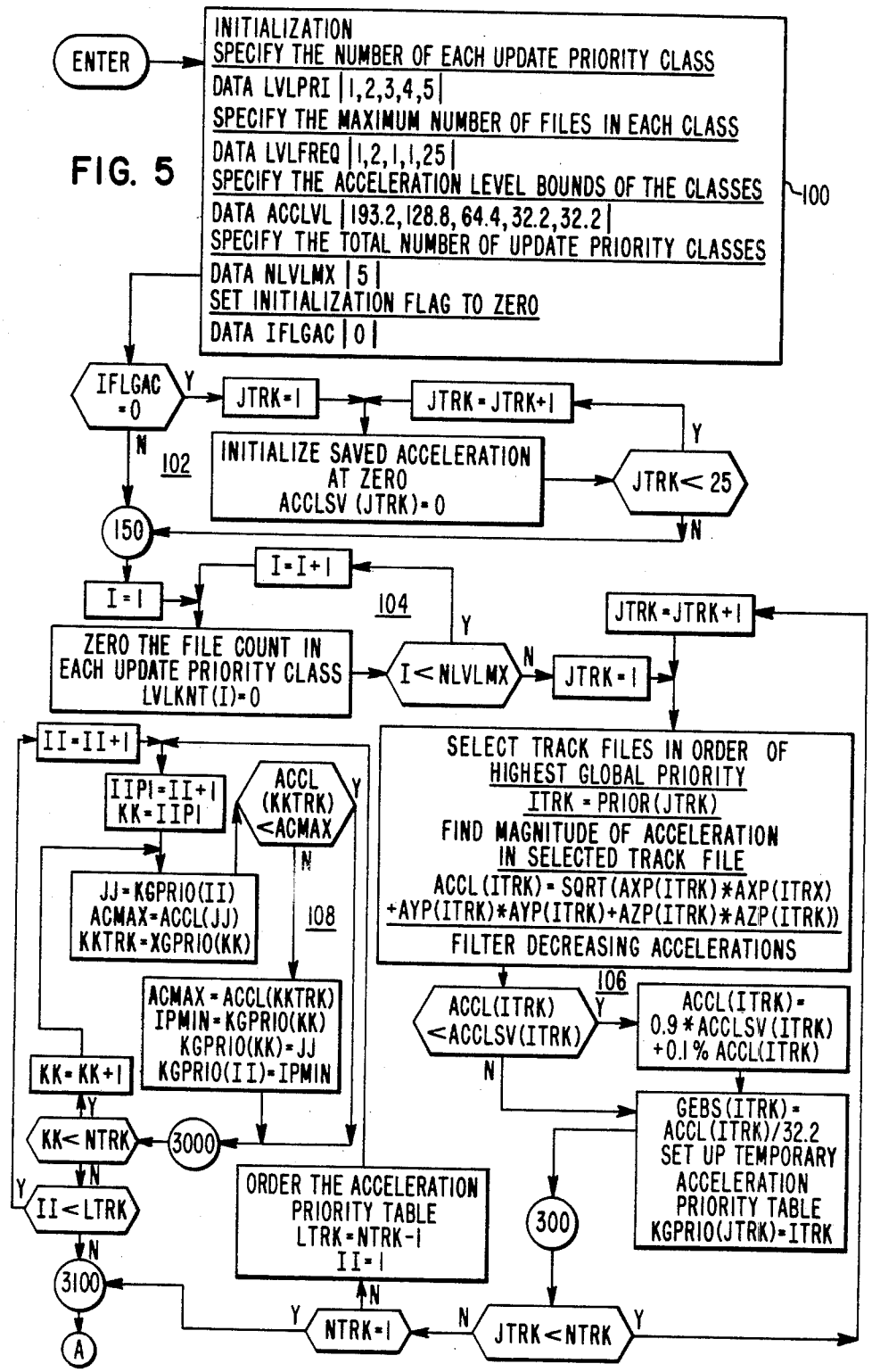
FIGS. 5 and 6 are flow diagrams of the processing functions performed by the priority portion of FIG. 1.
Figure 6:
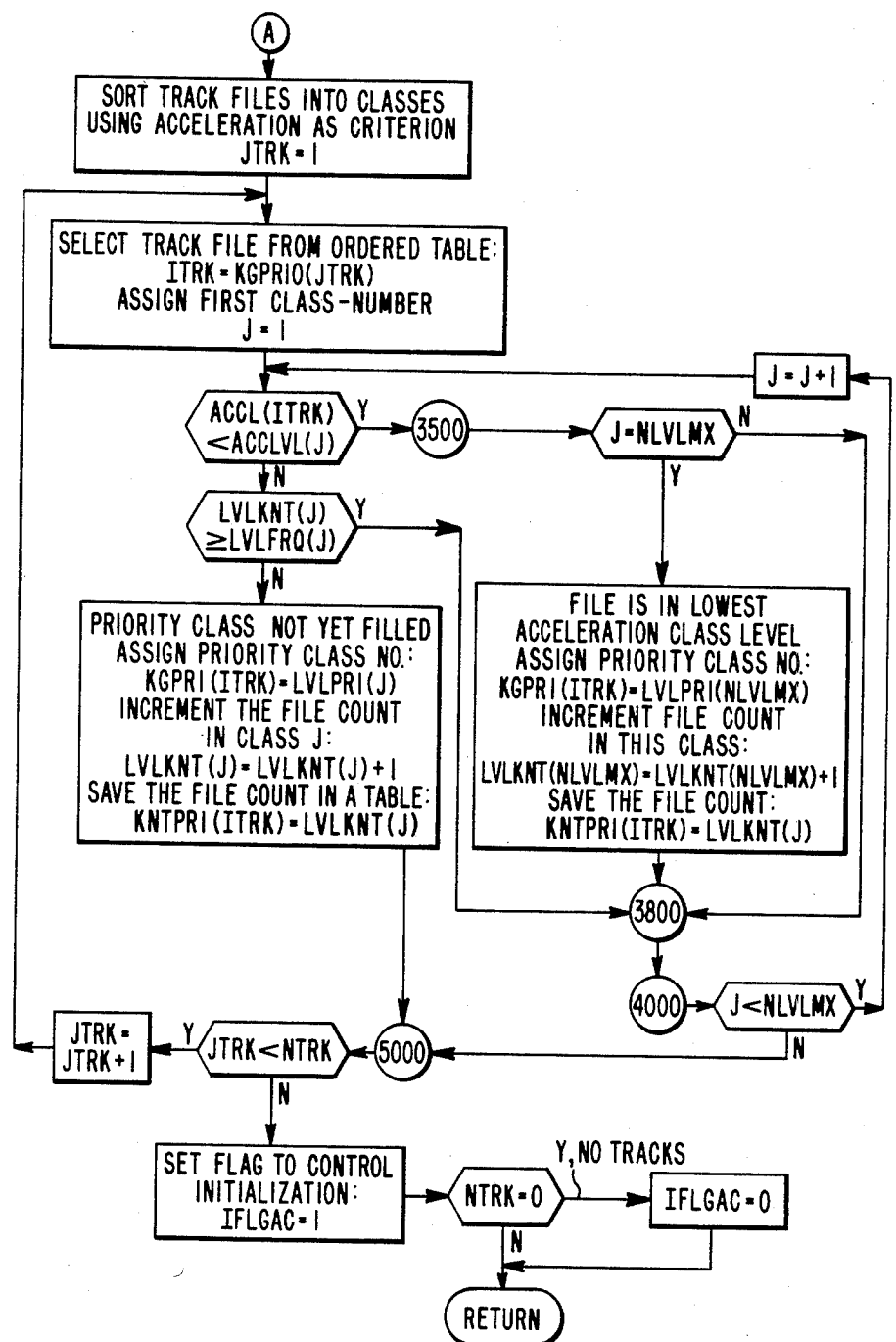

FIG. 5 is a flow chart diagram illustrating a portion of the program implemented by the priority submodule 19 of FIG. 1, referred to herein as the GPRIOR submodule, and FIG. 6 shows the remaining portion. The functions of the submodule GPRIOR are:

(1) To compute the magnitude of target acceleration for each track file.
(2) To form a priority table, KGPRIO(I), in which the tracks are ranked in order of decreasing acceleration. KGPRIO(1) identifies the track file showing the highest target acceleration.
(3) To sort the target accelerations into five classes. The classes are:
   (a) More than 6 g's or more than 193.2 ft/sec$^2$,
   (b) 4 to 6 g's or 128.8 ft/sec$^2$ up to 193.2 ft/sec$^2$,
   (c) 2 to 3.99 g's or 64.4 ft/sec$^2$ up to 128.7 ft/sec$^2$,
   (d) 1 to 1.99 g's or 32.2 ft/sec$^2$ up to 64.3 ft/sec$^2$,
   (e) Less than 1 g or less than 32.2 ft/sec$^2$.

Each track file, ITRK, is given its computed class under the designation KGPRI(ITRK). The position of the file within its class is given under the designation KNTPRI(ITRK). For example, if KGPRI(6)=5 and KNTPRI(6)=2, this means that track file number 6 has the update priority class of 5, and that this is the second file within class 5. The number of targets which may share a given update priority class is limited as previously discussed herein. Classes 1, 3 and 4 are limited to 1 target each, while two targets may occupy class 2, and all remaining targets except the five targets in classes 1 through 4 are pushed down to class 5. Class 5 targets, whether maneuvering or not, receive the data rate accorded to non-maneuvering targets.

FIG. 5 contains the initialization data for both FIGS. 5 and 6 in the first block 100. Each item of data is preceded by a caption explaining its purpose. The first do loop 102 terminates with statement 150. This loop initializes ACCLSV(ITRK), the acceleration saved from the last pass through GPRIOR, as zero for each track file. The second do loop 104 initially zeroes the file count, LVLKNT(I), in each of the 5 update priority classes.

The third do loop 106, terminating at statement 300, computes the acceleration magnitude, ACCL(ITRK), in each track file and compares it with the acceleration ACCLSV(ITRK) saved from the last pass through GPRIOR. If the present acceleration is less, it is filtered to prevent premature reclassification of the track to non-maneuvering status. The filter equation is ACCL(ITRK)=0.1 * ACCL(ITRK)+0.9 * ACCLSV(ITRK). An asterisk signifies a multiplication.

The final do loop 108 in FIG. 5 terminates at statement 3000. This loop arranges the track files in a table KGPRIO(I) with I running in order of decreasing acceleration from 1 to NTRK, the total number of tracks. KGPRIO(1) contains the number of the track file which shows the highest acceleration, while KGPRIO(NTRK) contains the file number associated with the smallest acceleration. Processing exits from FIG. 5 at point A and enters FIG. 6 at the matching point A.

According to FIG. 6, the track files in Table KGPRIO are sorted into five classes by comparing the acceleration, ACCL(ITRK) in track file ITRK with the five acceleration levels shown in the data table ACCLVL shown in the first block in FIG. 5. The successive classes are numbered as specified in Table LVLPRI of FIG. 5. The class number of each file, ITRK, is saved in a Table KNTPRI(ITRK). The total count within each class is limited to the values in the table LVLFRQ at the top of FIG. 5. When sorting is finished, the initialization flag IFLGAC is set to 1 on the initial pass to prevent further initializations in FIG. 5 unless the number of tracks, NTRK, drops to zero, in which case IFLGAC is reset to zero.

Submodule SCHEDM determines when a search dwell or a track dwell is to be initiated, and assigns the group of radar looks which constitute the dwell. If it is a track dwell, the track file number is assigned for illumination of its target. According to FIG. 7, submodule SCHEDM is initialized at block 110. If no search is desired, the flag NOSRCH is set equal to unity. Otherwise, it is set to zero. The total track dwell count, NSUMDW, and the initialization flag, IFLGTK, are zeroed. The number of looks in a track dwell and in a search dwell are specified by initializing NTKDWL and NSCDWL, respectively. NTDWSV and NSDWSV, which represent previous values of NTKDWL and NSCDWL, respectively, are also initialized.

A table INIDWL(I) is initialized by inspection of the table shown in FIG. 4. INIDWL(I) records the dwell number in which each track priority I is to be updated. A table, NDINTV(J), is initialized from the table of FIG. 4A. The dwell numbers of successive updates of a given track priority J, are differenced and this difference is recorded as NDINTV(J).

In addition to the initialization parameters just described, the initialization block 110 also set a large number, NLARGE, for sorting purposes. This number is arbitrarily defined. Also, tentative initial values are defined for ILKTRK, the tentative first look in a track dwell; INITRK, the recorded first look in a track dwell; INISCH, the recorded first look in a search dwell; and MODSCH, which is set to zero or one for track or search, respectively.

Figure 10:
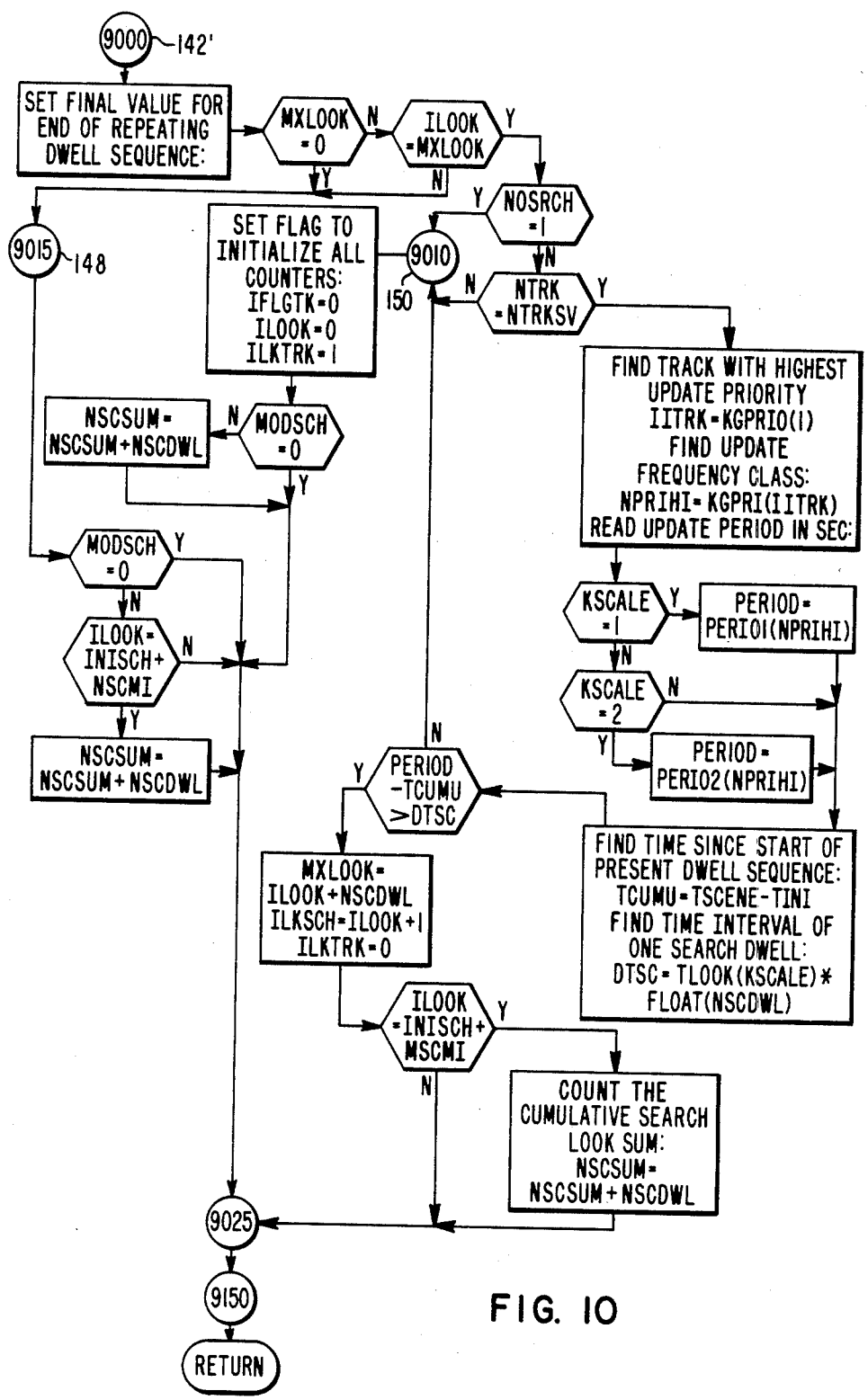

After initialization, a number of early tests are made in each pass through SCHEDM. If there are no tracks (NTRK=0), as shown by block 112, the initialization flag IFLGTK is set to zero by block 114 and the current pass is terminated at the end-point 9150 which is the point at which the program returns, as shown in FIG. 10. If time, TSCENE, is zero, the submodule is exited through points 9025 and 9150. If TSCENE is non-zero, ILKSCH, the first look in the next search dwell, is tentatively initialized as NTKDWL+1, which would be the look count following an initial track dwell.

Figure 7:
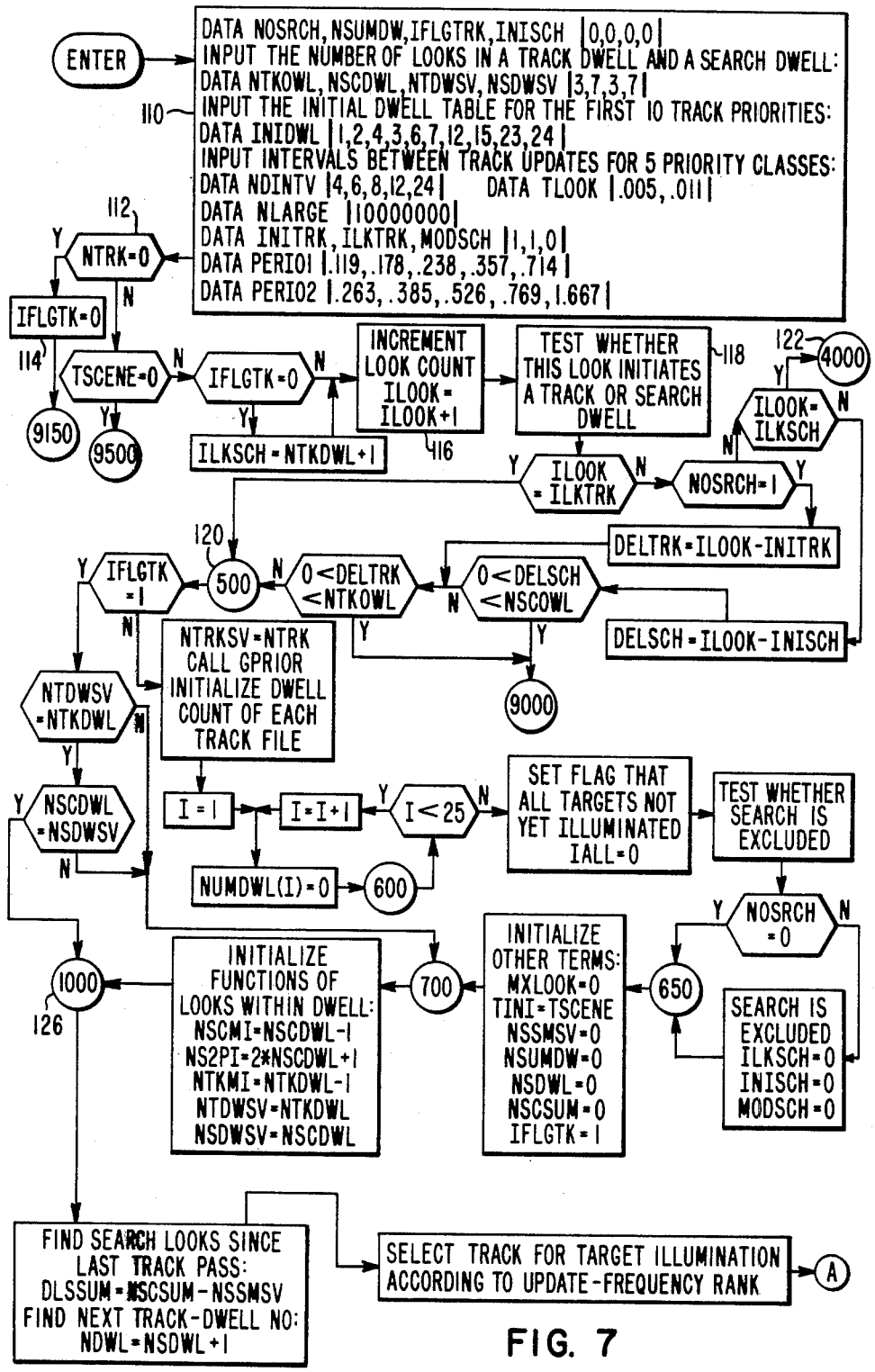
FIGS. 7, 8, 9 and 10 are flow diagrams of the processing functions performed by the scheduling portion shown in FIG. 1.

The look count, ILOOK, is incremented by one, and ILOOK is compared with the previously assigned look numbers ILKTRK or ILKSCH for initiating a track dwell or a search dwell, as shown principally by blocks 116 and 118 of FIG. 7. The operations proceed to point 500, shown in circle 120, where track dwell processing begins. If a search dwell is to be initiated, a jump to point 4000 as shown by circle 122, is made to perform search processing. Point 4000 is located at circles 124 and 140 in FIG. 9. If ILOOK is between the beginning and the end of a track dwell or a search dwell, the jump is to point 9000 at the beginning of FIG. 10.

As shown in FIG. 7, track processing is initialized after point 500, shown by circle 120. If the pass is sent through point 500 for track processing, the initialization flag IFLGTK is tested. If IFLGTK is unity, initialization is bypassed unless the number of looks in either a search dwell or a track dwell have been changed as indicated by lack of agreement of the numbers NTKDWL and NSCDWL, with the respective values, NTDWSV and NSDWSV, saved in a previous pass through module SCHEDM. If IFLGTK is zero, initialization is mandated.

If initialization is required, the number of tracks, NTRK, is saved as NTRKSV, subroutine GPRIOR is called, and the dwell count, NUMDWL(I), for each track file is zeroed. In addition, the flag IALL, which will later be set when all track targets have been illuminated, is zeroed. The flag NOSRCH is tested to determine if search is to be inhibited. If so, ILKSCH, 1NISCH, and MODSCH are zeroed. The term MXLOOK, which pertains to the completion of the current track versus search dwell sequence, is zeroed.

The initial time is recorded as TINI. The counters NSUMDW, NSCSUM, NSSMSV, and DSDWL are zeroed. Initialization further sets the flag IFLGTK to inhibit reinitialization. Frequently used functions of the number of the looks in a search dwell or a track dwell are precomputed and given the names NSCM1, NS2P1, and NTKM1. The current number of looks in a track dwell and in a search dwell are saved as NTDWSV and NSDWSV, respectively. When it is observed that the number of looks in a dwell no longer agrees with its saved value, the associated terms and functions are reinitialized. This procedure finishes at point 1000, which is shown by circle 126 in FIG. 7.

Point 1000 is the location at which operation flow is referred when the flag IFLGTK bypasses initializations. In preparation for tests to be made later, the number of search looks since the last track pass, LDSSUM, is computed by equation:

$$DLSSUM = NSCSUM - NSSMSV \quad (1A)$$

NSCSUM is the cumulative number of search looks since initialization. NSSMSV is saved from the last pass as shown in equation 32A which is set forth later in this description. The track dwell count saved from the last update pass in equation 33A, also set forth later, is incremented by 1 as shown in the equation:

$$NDWL = NSDWL + 1 \quad (1B)$$

Figure 8:
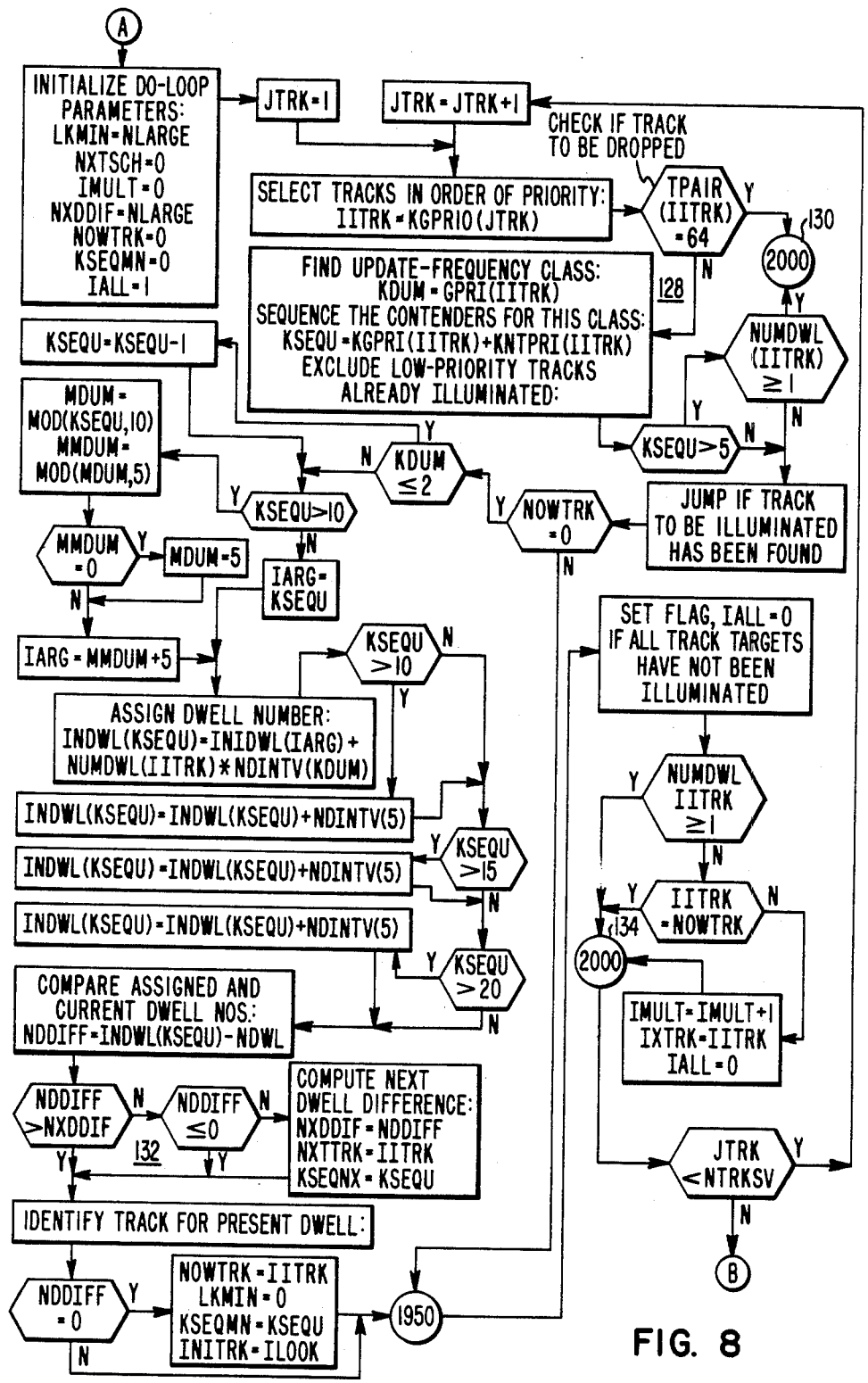

Operational flow then proceeds to poit A as shown in FIG. 8.

FIG. 8 illustrates the process for selecting the track file for target illumination and track update. According to FIG. 8, a do loop 128, terminating at point 2000 shown by circle 130, is set up to find the track file number, NOWTRK, of the target which should be illuminated next, and to find the initial look number, ILKTRK, of the corresponding track dwell. After initialization of the do loop, the track files are inspected in the order (JTRK) of their relative priority, KGPRIO(JTRK), as determined from relative acceleration magnitude in module GPRIOR. The file number, IITRK, is found by using the equation:

$$IITRK = KGPRIO(JTRK) \quad (2A)$$

By using the file number IITRK, its update frequency class is obtained from the Table KGPRI(IITRK) as in the following equation:

$$KDUM = KGPRI(IITRK) \quad (3A)$$

The priority sequence number, KSEQU, is found by summing the class number with the standing KNTPRI(IITRK), within the class, as shown by the equation:

$$KSEQU = KGPRI(IITRK) + KNTPRI(IITRK) \quad (4A)$$

Since class 2 contains two members and classes 1, 3 and 4 contain one member each, KSEQU is adjusted by the equation:

$$\text{If } KDUM \leq 2, KSEQU = KSEQU - 1 \quad (5A)$$

If KSEQU is greater than 5, this track is in the lowest priority class. If it has already been illuminated since initialization of the periodic counter, ILOOK, this is indicated by a count, NUMDWL(IITRK), greater than zero. If this indicator is non-zero, file IITRK is omitted from consideration by jumping to the end of the loop. If the jump is not executed, a test is made to see if KSEQU exceeds 10. If KSEQU is 10 or less, the dwell sequence shown in FIG. 4A can be used as a guide. The priority argument, IARG, to be used for this purpose is then set equal to KSEQU. If KSEQU exceeds 10, it is too large to be used as a priority number in the second line of the table shown in FIG. 4A. The argument, IARG, is then reduced to the following steps:

$$MDUM = MOD(KSEQU, 10) \quad (6A)$$

$$MMDUM = MOD(MDUM, 5) \quad (7A)$$

$$\text{If } MMDUM = 0, MMDUM = 5 \quad (8A)$$

$$IARG = MMDUM + 5 \quad (9A)$$

IARG will now be in the range from 6 to 10, which is the priority range of the targets with the lowest update count. The track dwell number, INDWL(KSEQU), to be assigned to the track file under consideration is computed by the equation:

$$INDWL(KSEQU) = INIDWL(IARG) + NUMDWL(IITRK) * NDINTV(KDUM) \quad (10A)$$

The first term on the right side of equation (10A), INIDWL(IARG), is read from the data table. The second term is the number of updates, NUMDWL(IITRK), multiplied by the number of dwells per update interval, NDINTV, for the given priority class. The priority class is not allowed to change until the overall dwell count is recycled after the lowest priority target has been updated.

If the priority sequence number KSEQU of the track file exceeds 10, the track updating is deferred by adding an additional increment NDINTV(5) to the dwell number obtained from equation (10A). This increment is again added for each multiple of 5 by which KSEQU exceeds 10. This, in conjunction with the reduced argument, IARG from equations (6A) through (9A), causes the low priority tracks with priority sequences 6 through N to be updated in successive groups of five with higher priority updates interleaved. For example, after all targets with priorities 1 through 5 have been updated once or more, priorities 6 through 10 are updated in their proper turn. When priorities 1 through 5 have been updated twice or more, priorities 11 through 15 are updated. This continues until all targets have been illuminated.

Having found the dwell number, INDWL(KSEQU), to be assigned to the track file under consideration in the current pass through the do loop, the dwell number is compared with the dwell number, NDWL, to be presently initiated.

$$NDDIF = INDWL(KSEQU) - NDWL \qquad (11A)$$

If NDDIFF is non-zero, it is sorted during successive passes through the do loop 130 to find the smallest value. The following terms are saved when the smallest non-zero value is found:

$$NXDDIF = NDDIFF \qquad (12A)$$

$$NXTTRK = IITRK \qquad (13A)$$

$$KSEQNX = KSEQU \qquad (14A)$$

If NDDIFF is zero, the computed dwell number is in the next track dwell to be initiated. The following terms are saved when NDDIFF is zero:

$$NOWTRK = IITRK \qquad (15A)$$

$$LKMIN = 0 \qquad (16A)$$

$$KSEQMN = KSEQU \qquad (17A)$$

$$INITRK = ILOOK \qquad (18A)$$

A test is now made to find whether all tracks have been updated. Equations 19A through 21A, set forth below, are executed if any unupdated track is found, such that NUMDWL(IITRK)=0, or if no track update match is found, such that NOWTRK=IITRK.

$$IMULT = IMULT + 1 \qquad (19A)$$

$$IXTRK = IITRK \qquad (20A)$$

$$IALL = 0 \qquad (21A)$$

The end-point 2000 represented by circle 134 in FIG. 8 of the do loop has now been reached. When all of the tracks have been inspected, operational flow enters point B of FIG. 9.

When all of the tracks have been cycled through the do loop described above, a number of questions still remain. These are:
(1) Was a track selected for updating?
(2) If no track was selected, are there enough radar looks before the next predicted track update to allow a search dwell to be inserted?
(3) If a search dwell cannot be inserted before the next track update dwell, should the look count be advanced to the next track dwell?
(4) If there is an update, should it be followed by a search dwell?
(5) Have all tracks been updated at least once?
(6) If all tracks have been updated, can the dwell sequence be terminated and recycled, or must additional search dwells be inserted to fill out the period between updates of the highest priority track?

Figure 9:
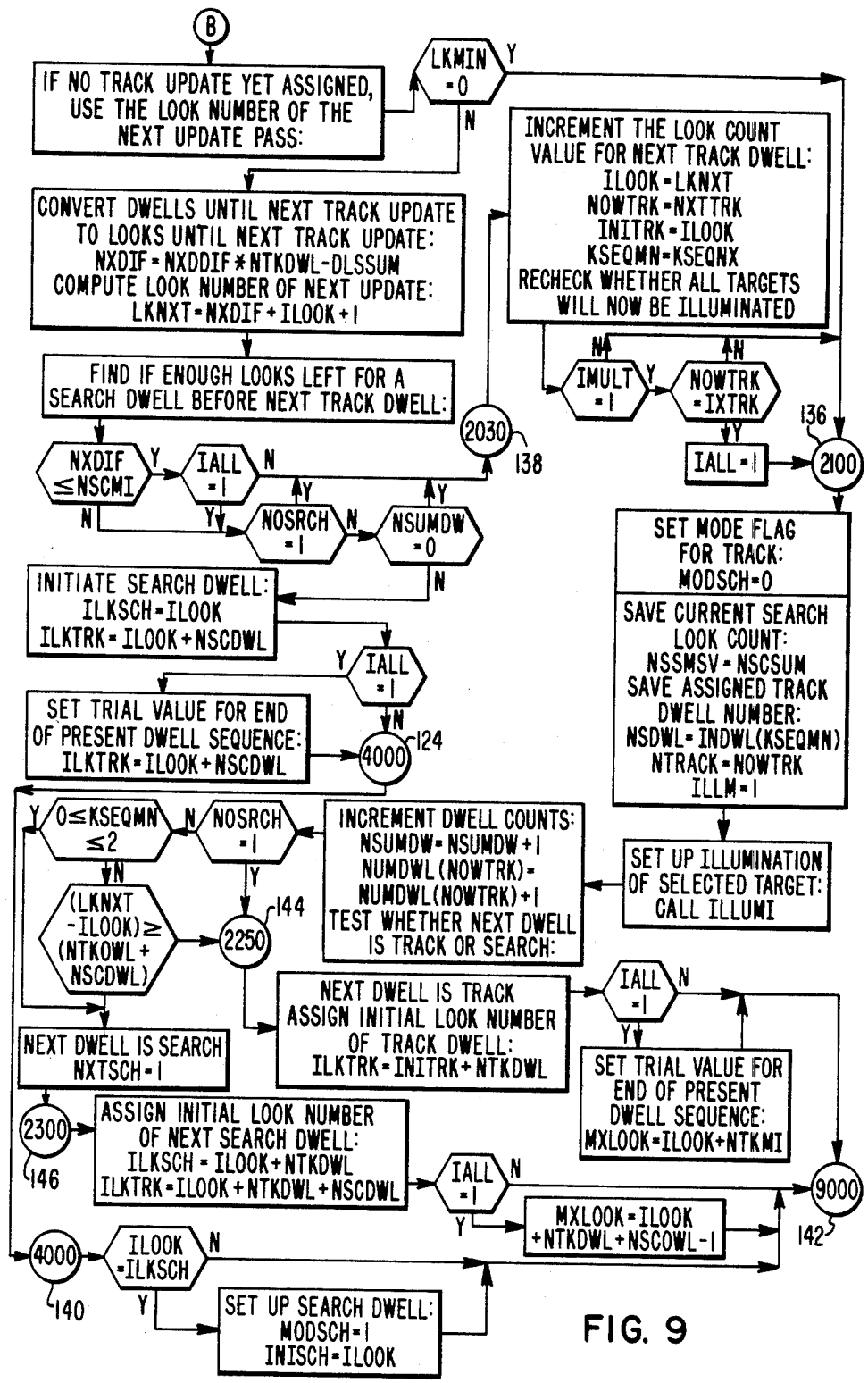

The answers to these questions and the actions to be taken are found by use of the flow charts shown in FIGS. 9 and 10. Question (1) is answered by testing LKMIN from equation (16A). If LKMIN is zero, a track has been found for updating. Action then proceeds to point 2100 shown in circle 136 of FIG. 9. If no track is found, question (2) is addressed.

To answer question (2), the number of radar looks, NXDIF, until the next track dwell is computed from the equation:

$$NXDIF = NXDDIF * NTKDWL - DLSSUM \qquad (22A)$$

DLSSUM was given by equation (1A). NXDDIF is the dwell difference until next update saved by equation (12A). NXDDIF is converted to radar looks by multiplying it by NTKDWL, the number of looks in a track dwell. DLSSUM, the number of search looks since the last track dwell, is then subtracted. The result, incremented by 1, is then added to the current look number ILOOK, in equation (23A) to find LKNXT, the number of the first look in the next track dwell.

$$LKNXT = NXDIF + ILOOK + 1 \qquad (23A)$$

Question (2) is now answered by comparing NXDIF with NSCM1, which is the number of looks in a search dwell decremented by 1. If NXD1F is not greater than NSCM1, and all tracks have not been updated (IALL=0), a search look cannot be inserted before the next track dwell. The program execution then proceeds to point 2030 shown in circle 138 of FIG. 9, which will be discussed in connection with questions (3) and (4).

If a search dwell is to be initiated because no track dwell is scheduled, and there are enough looks for a search dwell before the next predicted track dwell, the present radar look is made the first look of the search dwell by equation (24A) unless search is forbidden (NOSRCH=1) or no tracks have been illuminated (NSUMDW=0) in the current dwell sequence.

$$ILKSCH = ILOOK \qquad (24A)$$

The next track dwell is tentatively scheduled to start following the search dwell:

$$ILKTRK = ILOOK + NSCDWL \qquad (25A)$$

To answer question (5) in this situation, the flag, IALL, is now inspected for a value of unity, which indicates that all tracks have had their targets illuminated at least once during the current dwell sequence. If the flag is unity, a look number, MXLOOK, is computed for tentatively ending the present dwell sequence.

If IALL=1, $$MXLOOK = ILOOK + NSCM1 \quad (26A)$$

Computation now proceeds to point 4000 shown by circle 140 where, after confirmation that ILOOK is equal to ILKSCH, the search dwell is initiated by setting the mode flag MODSCH by the following equation:

$$MODSCH = 1 \quad (27A)$$

The look number initiating the search dwell is saved by the equation:

$$INISCH = ILOOK \quad (28A)$$

Computation then proceeds to point 9000, shown in circle 142, where end-of-pass tests will be made as described later.

The answer to question (3) concerns the action to be taken if a search dwell cannot be inserted. If all tests preceding point 2030, shown in circle 138 of FIG. 9, have been passed, question (3) has been answered in the affirmative. The current look, ILOOK, is advanced to that (LKNXT) scheduled to initiate the next track dwell.

$$ILOOK = LKNXT \quad (29A)$$

The number, NOWTRK of the track to be updated is supplied by equation (30A) from the number saved in the do loop shown in FIG. 8.

$$NOWTRK = NXTTRK \quad (30A)$$

The look number, INITRK, initiating the track dwell is saved by equation (31A).

$$INITRK = ILOOK \quad (31A)$$

The update priority sequence number KSEQMN is found by equation (31B).

$$KSEQMN = KSEQNX \quad (31B)$$

Tests are now made to address question (5) and to find whether all tracks have had a track dwell assigned during the current dwell sequence. The number of updated tracks was counted in the do loop of FIG. 8, and this count was saved as IMULT in equation (19A). If IMULT is unity, the associated track file number, IXTRK, from equation (20A) is unique. The track dwell assignment of equation (31A) completes the assignment of an update dwell of all tracks if IMULT is 1 and NOWTRK equals IXTRK. If these two conditions are found to be true, the flag IALL is set to one signifying that all of the tracks have had an update dwell assigned. This answers question (5). Question (4) remains to be answered later. Point 2100, shown in circle 136 of FIG. 9, is now encountered. Here the mode flag MODSCH is set to zero, the value for the track mode. The current search look count is saved by equation (32A) for future use in equation (1A).

$$NSSMSV = NSCSUM \quad (32A)$$

The assigned track dwell number is saved in equation (33A) for future use in equation (1B).

$$NSDWL = INDWL(KSEQMN) \quad (33A)$$

Subroutine ILLUMI is called to implement the track dwell. In this subroutine, the contents of the track file having the number saved under the name NOWTRK is inspected and the range, range-rate, and bearing angles of the associated targets are computed so that the sensor beam may be directed at the target for the duration of the track dwell. The overall dwell count is now incremented by equation (34A), and the individual dwell count of the selected track file is incremented by equation (35A).

$$NSUMDW = NSUMDW + 1 \quad (34A)$$

$$NUMDWL(NOWTRK) = NUMDWL(NOWTRK) + 1 \quad (35A)$$

According to the preceding discussion, a track update dwell has now been assigned. It is now necessary to answer question (4) and tests are now made to find whether this track dwell should be followed by a search dwell or another track dwell. If flag NOSRCH equals 1, search is forbidden and action proceeds to point 2250, shown in circle 144 of FIG. 9, where the next track dwell is tentatively assigned.

If NOSRCH is zero, the update priority sequence number KSEQMN is tested. If KSEQMN is either 1 or 2, the track dwell is immediately followed by a search dwell to assure that approximately half of the radar looks are devoted to search. In this case, the flag NXTSCH is set equal to 1, signifying that the dwell following the track dwell will be a search dwell. If KSEQMN is neither 1 nor 2, the interval until LKNXT, the look number initiating the next preceding track dwell is tested to see whether LKNXT−ILOOK is greater than or equal to a look sum of a track dwell (NTKWL) and a search dwell (NSCDWL). If true, NXTSCH is set equal to 1.

If NXTSCH is 1, the program execution proceeds to point 2300 shown in circle 146 of FIG. 9. To find the look number ILKSCH initiating the subsequent search dwell, the number of looks in a track dwell is added to the current number as in the equation:

$$ILKSCH = ILOOK + NTKDWL \quad (36A)$$

The initial look of the subsequent track dwell is then given by equation:

$$ILKTRK = ILOOK + NTKDWL + NSCDWL \quad (37A)$$

If all tracks have been assigned a dwell, the tentative look number MXLOOK, ending the present dwell sequence, is assigned by equation (38A), which forces MXLOOK to be the end look of a search dwell.

If IALL=1, $$MXLOOK = ILOOK + NTKDWL + NSCDWL - 1 \quad (38A)$$

Processing now proceeds to point 9000 shown in circle 142 of FIG. 9.

If the subsequent dwell is a track dwell (point 2250, circle 144 of FIG. 9), NXTSCH is zero, and the look number initiating the succeeding track dwell is given by equation 39A.

$$\text{ILKTRK} = \text{INITRK} + \text{NTKDWL} \tag{39A}$$

The tentative value of MXLOOK is assigned by the equation:

$$\text{MXLOOK} + \text{ILOOK} + \text{NTKM1} \tag{40A}$$

NTKM1 is one less than the number of looks in a track dwell, so that MXLOOK is the end look of the present track dwell. Action now proceeds to point 9000 of FIG. 9 where question (6) is considered.

FIG. 10 indicates the program steps which are used to answer question (6), that is, to determine the end of the dwell sequence. The first condition for ending the current dwell sequence is that all tracks have had at least one update dwell assigned, and the current dwell has been completed. The second condition is that, if search is not inhibited, the elapsed time since initialization of the dwell sequence should be no shorter than the period of the highest update frequency required. The first condition is satisfied if the current look number ILOOK equals the non-zero value of MXLOOK assigned by one of the equations (26A), (38A) or (40A). FIG. 10 shows the flow chart of the process. Beginning at point 9000, shown by circle 142', the first test is for a non-zero value of MXLOOK. If MXLOOK is zero, the first condition is not satisfied, and the pass is sent to point 9015, circle 148, for end-of-pass processing. At point 9015, the pass is terminated at the submodule exit if in track mode (MODSCH=0) or if ILOOK is not the end of a search dwell (ILOOK=INISCH+NSCM1). If ILOOK ends a search dwell, the cumulative search-look sum, NSCSUM, is incremented and the pass is terminated.

If MXLOOK is equal to ILOOK and search is inhibited, the dwell sequence is terminated at once by sending the pass through point 9010, shown in circle 150 of FIG. 10. Here, a new dwell sequence is set up to start during the next pass. The look count, ILOOK, is set to zero. The initialization flag, IFLGTK, is zeroed to set up further initializations in the next pass. The first look of the next pass is tentatively assigned as the beginning of a track dwell by setting ILKTRK equal to 1. The current pass and the current dwell sequence are then terminated by exiting the submodule.

To find whether the dwell sequence must be extended by further search dwells until it approximates the update period of the highest priority track, it requires several steps. These steps are:

(1) The file number of the track with highest update priority is first obtained by reading the table entry KGPRIO(1).

$$\text{IITRK} = \text{KGPRIO}(1) \tag{41A}$$

(2) The update priority class is then found by reading the table KGPRI.

$$\text{NPRIHI} = \text{KGPRI(IITRK)} \tag{42A}$$

(3) The period length in seconds of this priority class is found by reading the table entry PERIO1(NPRIHI). If at short range (KSCALE=1), the equation is:

$$\text{PERIOD} = \text{PERIO1(NPRIHI)} \tag{43A}$$

If at long range (KSCALE=2), the equation is:

$$\text{PERIOD} = \text{PERIO2(NPRIHI)} \tag{43B}$$

(4) The elapsed time within the current dwell sequence, TCUMU, is found by the equation:

$$\text{TCUMU} = \text{TSCENE} - \text{TINI} \tag{44A}$$

(5) The time required to perform one more search dwell is found by multiplying the duration of one radar look, TLOOK(KSCALE), by the number of looks in a search dwell.

$$\text{DTSC} = \text{TLOOK(KSCALE)} * \text{NSCDWL} \tag{45A}$$

(6) If DTSC is not less than PERIOD-TCUMU, there is not enough time to perform a search dwell. The pass is then routed to point 9010 where the dwell sequence is immediately terminated as previously described.

(7) If DTSC is less than PERIOD-TCUMU, at least one more search dwell is necessary to extend the dwell sequence to the end of the period.

MXLOOK is incremented by the number of looks in a search dwell, and ILKSCH, the start of the next search dwell, is assigned as ILOOK+1. ILKTRK is zeroed to inhibit track. These steps are repeated when ILOOK again equals MYLOOK until there are no longer enough looks to perform a search dwell before the end of the track-update period. The dwell sequence is then terminated through point 9010 and a new dwell sequence is initialized as previously described.

The mode scheduling system described herein offers the flexibility provided by scheduling events in terms of relative frequency rather than actual frequency of occurrence. This allows inclusion or exclusion of interleaved search processes in a convenient manner, as well as look and dwell durations which vary as a function of radar mode and system mechanization. The result is an event scheduling mechanization which gives the best tradeoff performance among the updates of the various target files and the interleaved search processes.

We claim as our invention:

1. A track-while-scan radar system having a repetitive dwell period during which track and search dwells are performed, said radar system comprising:
   means for transmitting illuminating track and search dwell signals during the dwell period;
   means for receiving echo signals from illuminated targets;
   means for assigning a predetermined number of track dwell intervals to the dwell period;
   means for determining the acceleration of the targets which have returned echo signals;
   means for classifying the targets into priority classes depending upon the acceleration of the targets;
   means for setting and controlling the frequencies at which each target within each class is updated, said updating being accomplished by transmitting an illuminating track dwell signal during one of the track dwell intervals of the dwell period; and
   means for placing search dwells at track dwell intervals when the number of targets being tracked is not sufficient to require track dwells at all the intervals to satisfy the update frequency requirements.

2. The radar system of claim 1 including means for inserting search dwells between track dwell intervals when the time needed to complete the search dwell is less than the time to the next scheduled track dwell.

3. The radar system of claim 2 wherein the inserting means always inserts a sufficient number of search dwells to allocate at least 49% of the time of the dwell period to search dwells.

4. The radar system of claim 1 wherein the update frequencies associated with the setting and controlling means are arranged in decreasing values, with the highest update frequency value corresponding to the class selected to contain a target having the highest acceleration value, and with the lowest update frequency value corresponding to the class selected to contain a target having the lowest acceleration value.

5. The radar system of claim 4 wherein all of the update frequency values, except the lowest update frequency value, are multiples of the lowest update frequency value.

6. The radar system of claim 5 wherein there are five update frequency values.

7. The radar system of claim 6 wherein four of the update frequency values are multiples of the lowest frequency value, with the ratios from highest to lowest being 6, 4, 3 and 2.

8. The radar system of claim 1 wherein there are five priority classes.

9. The radar system of claim 1 including means for limiting the maximum number of targets which may be classified into each priority class.

10. The radar system of claim 9 wherein, when the number of targets to be tracked in the lowest priority class exceeds the maximum number of targets which may be included in said class, a portion of the targets are assigned to said class during a first dwell period, and another portion of the targets are assigned to said class during the next dwell period.

11. The radar system of claim 1 wherein the predetermined number of track dwell intervals is 24.

12. A track-while-scan radar system having a repetitive dwell period during which track and search dwells are performed, said radar system comprising:
 means for transmitting illuminating track and search dwell signals during the dwell period;
 means for receiving echo signals from illuminated targets;
 means for assigning 24 track dwell intervals to the dwell period;
 means for determining the acceleration of the targets which have returned echo signals;
 means for classifying the targets into first, second, third, fourth and fifth update priority classes according to the acceleration of the targets, with the first priority class corresponding to the highest acceleration level and the fifth priority class corresponding to the lowest acceleration level;
 means for limiting the number of targets assigned to said first priority class to one, to said second priority class to two, to said third priority class to one, and to said fourth priority class to one;
 means for assigning target track dwells to the track dwell intervals of the dwell period for updating any target in the first priority class six times during a dwell period, to update any target in the second priority class four times during a dwell period, to update any target in the third priority class three times during a dwell period, to update any target in the fourth priority class two times during a dwell period, and to update any target in the fifth priority class no more than once during a dwell period; and
 means for placing search dwells at track dwell intervals when track dwells are not needed at all the intervals to satisfy said update requirements.

13. The radar system of claim 12 including means for inserting search dwells between track dwell intervals of the dwell period when the time needed to complete the search dwell is less than the time to the next scheduled track dwell, with the inserting means inserting sufficient dwells to maintain the searching mode during at least 49% of the duration of the dwell period.

14. A method of scheduling between the track and dwell modes of a track-while-scan radar system having a repetitive dwell period, said method comprising the steps of:
 establishing a fixed number of track dwell intervals for the dwell period;
 observing the acceleration of targets being tracked;
 classifying the targets into priority classes according to the observed accelerations;
 specifying the number of times during a dwell period that each target in each class uses a track dwell interval to update its position;
 substituting a search dwell for a track dwell of the dwell period when the number of targets being tracked is not sufficient to require all of the track dwell intervals to satisfy the position updating requirements during each track period; and
 positioning search dwells between track dwell intervals when sufficient time exists.

15. The method of claim 14 wherein the fixed number of track dwell intervals is established as 24, and the targets are classified into five priority classes.

* * * * *